United States Patent
Eberhard

(10) Patent No.: US 6,457,144 B1
(45) Date of Patent: *Sep. 24, 2002

(54) SYSTEM AND METHOD FOR COLLECTING TRACE DATA IN MAIN STORAGE

(75) Inventor: Raymond J. Eberhard, Endicott, NY (US)

(73) Assignee: International Business Machines Corporation, Armonk, NY (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/206,326

(22) Filed: Dec. 8, 1998

(51) Int. Cl.⁷ ................................................ H02H 3/05
(52) U.S. Cl. ............................. 714/45; 710/32; 710/57; 712/227
(58) Field of Search .............................. 714/45, 39, 25, 714/1, 44, 40, 42, 6; 712/219, 227; 710/57, 20, 21, 32, 55

(56) References Cited

U.S. PATENT DOCUMENTS

| | | | | |
|---|---|---|---|---|
| 4,445,192 A | | 4/1984 | Haag et al. ................. 364/900 |
| 4,574,351 A | | 3/1986 | Dang et al. ................. 364/200 |
| 4,924,466 A | * | 5/1990 | Gregor et al. ................ 371/12 |
| 4,937,740 A | * | 6/1990 | Agarawal et al. ........... 364/200 |
| 5,274,811 A | * | 12/1993 | Borg et al. .................. 395/700 |
| 5,297,277 A | * | 3/1994 | Dein et al. .................. 395/575 |
| 5,355,487 A | | 10/1994 | Keller et al. ................ 395/650 |
| 5,371,878 A | | 12/1994 | Coker ......................... 395/500 |
| 5,386,565 A | | 1/1995 | Tanaka et al. .............. 395/700 |
| 5,642,478 A | * | 6/1997 | Chen et al. .................... 714/45 |
| 5,689,636 A | * | 11/1997 | Kleber et al. ................ 714/45 |
| 5,724,505 A | * | 3/1998 | Argade et al. ............... 714/45 |
| 5,764,885 A | * | 6/1998 | Sites et al. ................... 714/45 |
| 5,978,902 A | * | 11/1999 | Mann ......................... 712/227 |
| 6,018,809 A | * | 1/2000 | Garrett ....................... 714/37 |
| 6,134,676 A | * | 10/2000 | VanHuben et al. .......... 714/39 |

* cited by examiner

Primary Examiner—Jeffrey Gaffin
Assistant Examiner—Rijue Mai
(74) Attorney, Agent, or Firm—Shelley M Beckstrand

(57) ABSTRACT

A memory controller used to manage the memory interface (main store interface) for processor and input and output (I/O) device access, includes a trace array used for accumulating trace data signals to be stored to main store, control logic used to determine when the array should be updated and when its contents should be stored to main store, an address register which provides the starting address of main store assigned to store trace data, an offset address register which identifies the current address to store trace data, and a space size register used to identify the amount of main store reserved to store trace data. In a first implementation, the contents of the trace array are moved to main store when the trace array becomes full. An alternative implementation provides additional control registers and logic which allow memory to be updated from the trace array when the memory interface is not busy.

17 Claims, 3 Drawing Sheets

SYSTEM AND METHOD FOR COLLECTING TRACE DATA IN MAIN STORAGE

BACKGROUND OF THE INVENTION

1. Technical Field of the Invention

This invention pertains to capturing trace data. More particularly, it pertains to capturing trace data for storage in main store.

2. Background Art

Processor architectures often provide mechanisms for capturing instruction streams to aid performance analysis. However, there is also a need to provide for capture of processor bus and I/O bus behavior which is useful for analyzing memory controller performance. Further, having detailed and accurate information about instruction frequency and sequences is important for developing designs having high performance.

On-chip entities known as trace arrays which are used to collect information useful for debug have finite depth and are often not deep enough to capture enough information to completely analyze a problem. A solution which has been used to address this problem provides off-chip signals (chip I/Os) to convey this same information to an external logic analyzer. This solution is costly since it reserves chip I/Os for problem debug which otherwise could be used to enhance performance or function.

U.S. Pat. No. 5,355,487 describes a software tracing system in which a trace buffer is configured as two buffers. This system requires the use of a trace hook and timer interrupts for controlling the interrupt mechanism. There is a need in the art for a method and system for tracing many facilities each hardware cycle and is, therefore, not constrained by a timer interrupt mechanism.

Other software tracing systems provide for storing memory references into a software trace buffer when code inserted into an instruction stream by a linker specifies that a storage reference should be stored to the trace buffer. Such systems require link code modification to insert trace buffer update instructions into the instruction stream, resulting in an undesirable change in the characteristics of the mechanism being tested.

It is an object of the invention to provide an improved trace system and method.

It is a further object of the invention to provide a trace system and method which provides for capture of processor bus and I/O bus behavior.

It is a further object of the invention enable development of computer designs having high performance.

It is a further object of the invention to provide off-chip storage of trace data which does not reserve and consume chip I/Os for problem debug.

It is a further object of the invention to provide a trace mechanism which is capable of tracing many facilities each hardware cycle.

It is a further object of the invention to provide a target system under test which stores trace signals to main store, the trace signals in main store thereafter being available for access and analysis by any mechanism which is capable of accessing main store, such as an I/O device, a target processor, or another processor.

It is a further object of the invention to provide a hardware tracing system which does not require the insertion of software trace instructions into the instruction stream.

SUMMARY OF THE INVENTION

In accordance with the invention, a system and method is provided for capturing trace data in main store. Trace data signals are captured and driven to a trace array for storage. In accordance with a first embodiment, responsive to the trace array becoming full, further trace signal capture is disabled and the contents of the trace array are moved to main store. In accordance with a second embodiment, the contents of the trace array are moved to main store when a storage request queue is empty.

Other features and advantages of this invention will become apparent from the following detailed description of the presently preferred embodiment of the invention, taken in conjunction with the accompanying drawings.

BEST MODE FOR CARRYING OUT THE INVENTION

Figure 1:
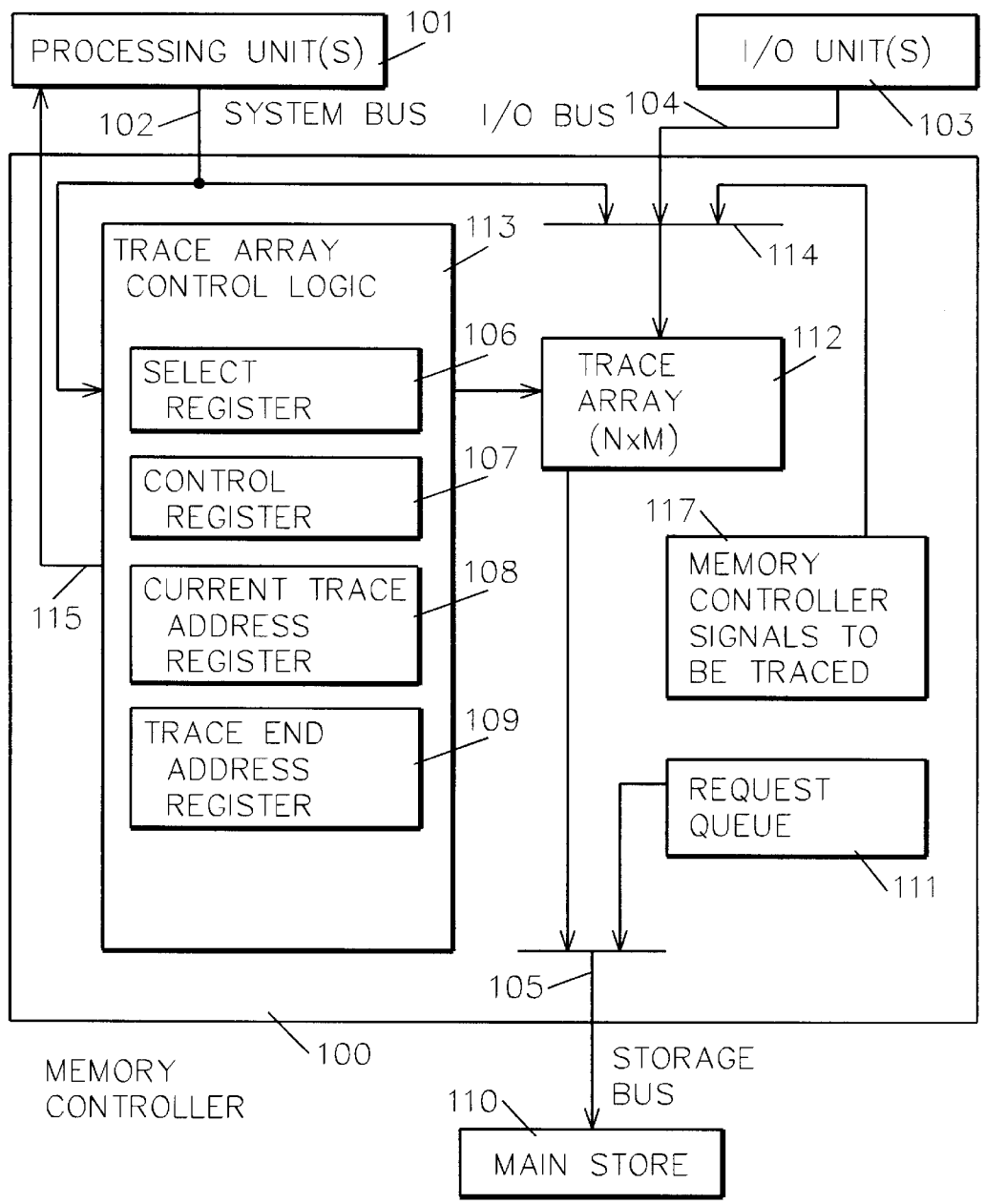
FIG. 1 illustrates the system of the invention for collecting and storing trace data to main store.

In accordance with the invention, a method and system is provided for capturing instruction sequence and instruction frequency data in a processor's main store—these are signals which are useful for hardware or software debug and performance monitoring. Additionally, it provides a method and system for capturing hardware debug information which otherwise exceeds the storage capability of a memory controller's trace array by storing this same information in main store. Which signals to record, when recording should begin, and which addresses in main store are used to store the signal values are selectable via program control. Once recording has completed, the signal values are accessed from main store by either the same processor, or a remote processor, via execution of a list of instructions which comprise a software program. Depending on its design, the software program provides an analysis which is useful for measuring performance or debugging hardware or software problems.

The system of the invention includes a memory controller used to manage the memory interface (main store interface) for processor and input and output (I/O) device access, a storage array used for accumulating trace data to be stored to main store, control logic used to determine when the array should be updated and when its contents should be stored to main store, an address register which provides the starting address of main store assigned to store trace data, an offset address register which identifies the current address to store trace data, and a space size register used to identify the amount of main store reserved to store trace data. Additionally, in accordance with a preferred embodiment of the invention, data capture is controlled by way of a sequence of instructions, i.e., a computer program.

Logic which selects the source of data to be traced, that is, internal memory controller behavior, processor bus behavior, or I/O bus behavior is controlled by registers that contain a value which identifies the source to be traced. The source selected to be traced is changed by modifying the value stored in these registers. The value of a register is modified by either a memory mapped I/O (MMIO) request received from a processor, or by a request received from an IEEE 1149.1-like scan interface. The ability to select when and what to trace by way of an MMIO request is very desirable since this provides the system of the invention with the ability to be controlled by way of a computer program.

A selected source is stored and accumulated in an on chip storage array, that is, a trace array of N words by M bits. Additional mechanisms and controls are provided to determine if data updates the array each machine cycle, or if the collection of data should occur only when a condition corresponding to criteria provided in a matching criteria control register is satisfied. The matching criteria control register is updated using the same technique used to update the registers which select trace source data.

While in storage array update mode, when control logic determines that data delivered to the array should be preserved, the array write address counter increments by one, providing the array with the next sequential address to store data. Data stored to the preceding address is preserved. The write address counter continues to increment as data store requests are received from control logic until all N storage locations in the storage array have been updated.

When the Nth location of the storage array has been updated with data, the array update control is disabled. The current offset address is compared to the addresses provided in the trace starting address register and space size register. This comparison is performed to determine if enough memory remains within a predefined space in main store to store the contents of the storage array. If not enough memory exists to store the contents of the storage array, an attention signal is activated requesting program intervention. If trace space in main store exists, subsequent requests received on buses selected as an input source to the array are stalled. Requests which would otherwise be driven on the memory interface are stalled, and the contents of the storage array is read from the array and stored to main store beginning at the offset address. Once the update of the storage array's contents to main store is complete, the offset register is incremented by an amount equivalent to the number of memory addresses consumed by the contents of the array. Once the contents of the array have been stored to main store and the offset address register has been updated, requests which have been stalled are allowed to continue.

Since stalling requests may affect the nature of what's being traced, an alternative implementation provides additional control registers and logic which allow memory to be updated from the storage array when the memory interface is not busy. The memory interface is busied with requests which store data from the storage array to main store until either all data captured in the storage array is stored to main store or until a memory request is received from either the processor or I/O bus. Control logic is provided to keep track of what portion of the storage array contains data to be stored to main store. If the memory interface is too busy to store the contents of the storage array and the array becomes full with captured data, either use of the memory interface by the processor or I/O is temporarily stalled to perform a partial or complete update of the storage array's contents to main store, or an attention signal is activated indicating no further trace information will be collected. The choice of what should occur when the storage array is full and the memory interface is in use is selectable via control registers.

Once data capture in main store is complete, preexisting mechanisms which read data from main store are used to access this data. Given these mechanisms, data collected in this manner is easily accessed and may be readily provided to software tools used for analyzing this data.

Referring to FIG. 1, requests are received by memory controller 100 from either processing unit 101 via system bus 102, or an I/O unit 103 via I/O bus 104. Depending on a request's type and address, a request may either be forwarded to main store 110 via storage bus 105, or may target a specific register 106–109 within memory controller 100. The availability of storage bus 105 to deliver requests to main store 110 and the latency of main store 110 data access requires memory controller 100 to queue requests from system bus 103 or I/O bus 104 in queue 111 until the time when needed resources become available.

Embedded within memory controller 100 is trace array 112 and its corresponding trace array control logic 113. Trace array 112 is a simple storage array N entries deep by M bits wide which is used as temporary storage for signal values which are to be stored to main store 110. Trace array control logic 113 includes several registers 106–109 used for controlling trace operations which are accessible via program control, i.e. register space read/write. Trace control register 107 is used to enable/disable the trace function, control when trace record requests are sent to memory controller 100, and identify those conditions that cause trace array entry creation. Trace select register 106 provides select signals to a multiplexer 114 having inputs including system bus 102, I/O bus 104, and memory controller signals 117 wired with all possible memory controller 100 signals of interest, i.e. useful for performance analysis, and software/hardware debug. Current trace address register 108 contains the address in main store 110 next to be updated with an entry from trace array 112. Trace end address register 109 contains the address of the last storage address assigned in main store 110 to store signal values.

Figure 2:
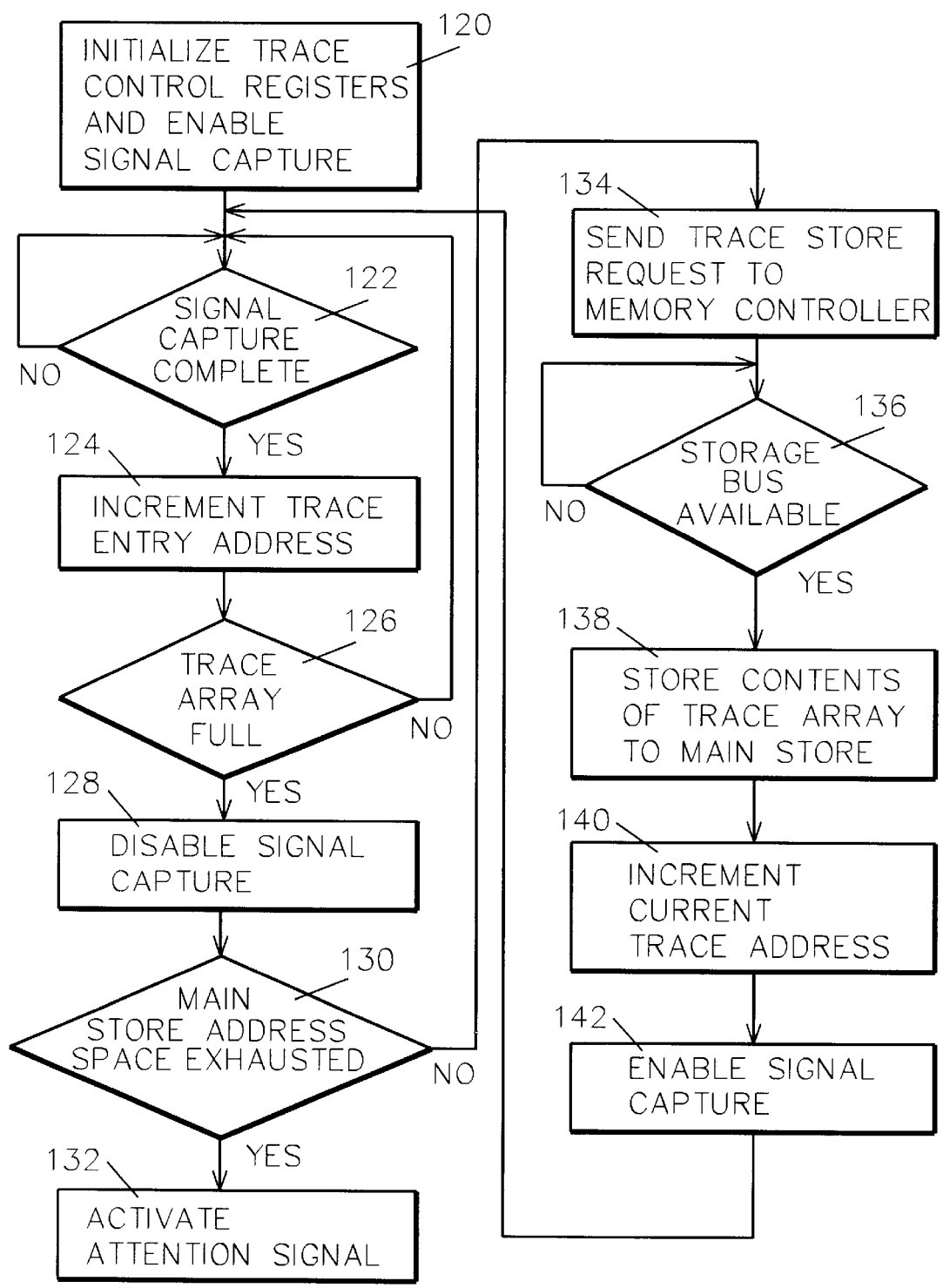
FIG. 2 illustrates the method steps of a first preferred embodiment of the invention.

In accordance with the method of a preferred embodiment of the invention, referring to FIG. 2 in connection with FIG. 1, in step 120 trace control registers 113 are initialized to enable signal capture. As requests received from either system bus 102 or I/O bus 103 are processed by memory controller 100, signals 114 selected by preprogrammed select register 106 are driven to trace array 112 to be stored. In steps 122 and 124, once signal capture for an addressed entry of trace array 112 is complete, trace array control logic 113 increments the store address it supplies to trace array 112 so that signal values previously captured in trace array 112 are preserved. The resulting incremented address becomes the next entry in trace array 112 used to capture signal values 114.

In steps 126 and 128, once all available entries within trace array 112 contain captured signal values, signal capture is disabled and, in step 130, trace array control logic 113 compares the size of trace array 112 and the address stored in current trace address register 108 to the address stored in trace end address register 109. If the store request exceeds the capacity of the address space assigned to trace, in step 132 attention signal 115 is activated, indicating that the address space reserved in main store 110 to record trace data has been exhausted. If sufficient space exists in main store 110, in step 134 trace array control logic 113 requests memory controller 100 to store the contents of trace array 112 to main store 110, preempting if necessary any other storage requests memory controller 100 might issue from request queue 111 to storage bus 105. Once it is determined in step 136 that storage bus 105 is available, in step 138 the contents of trace array 112 are stored to the main store 110 address identified by current trace address register 108. Once array 112 contents are stored to main store 110, in step 140, the address stored in current trace address register 108 is incremented by an amount equivalent to the amount of storage consumed by the store, and in step 142 signal capture is enabled. Thereupon, storage bus 105 returns to handling requests in queue 111 received from memory controller 100 on behalf of processor 101 and I/O 103.

Figure 3:
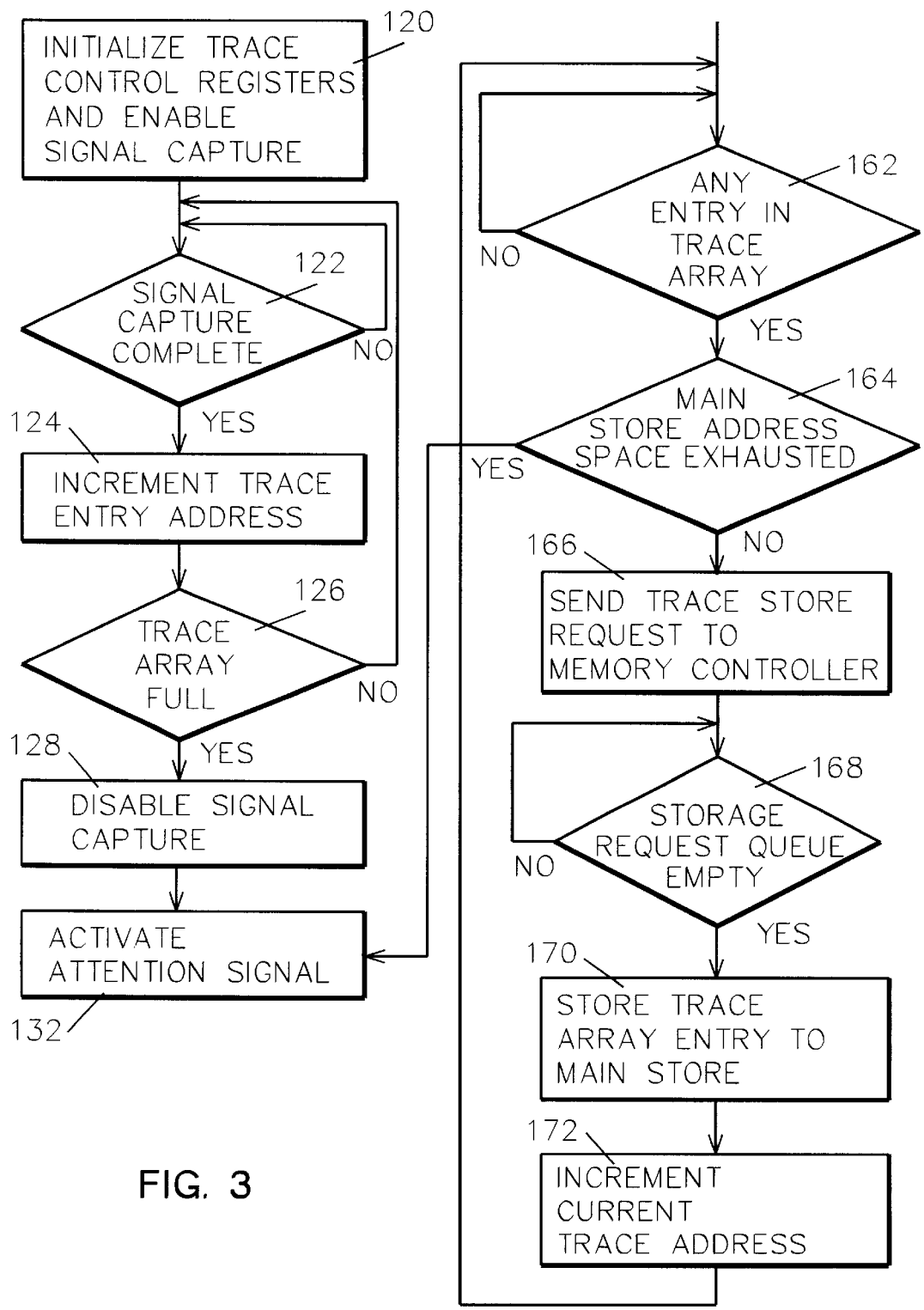
FIG. 3 illustrates the method steps of a second preferred embodiment of the invention.

In accordance with the method of a further preferred embodiment of the invention, referring to FIG. 3 in connection with FIG. 1, steps 120, 122, 124, 126, 128 and 132 function as described above with respect to FIG. 2, with some modification as described below. In accordance with this further embodiment, captured signal values are delivered from trace array 112 to main store 110 whenever one or more trace records exist in trace array 112 and memory controller's storage request queue 111 is empty. Storage request queue 111 queues requests it receives from either system bus 102 or I/O bus 104 that are destined for main store 110.

The method of this further preferred embodiment requires that trace array control logic 113 track those entries in trace array 112 which contain signal records which have not yet been stored to main store 110. In steps 162 and 164, when trace array 112 contains one or more signal records, trace array control logic 113 first determines whether or not sufficient address space remains in main store 110 to honor the request by comparing the size of its store request to the addresses found in current trace address register 108 and trace end address register 109. If the store request exceeds the capacity of the address space assigned to trace, in step 132 attention signal 115 is activated, indicating that the address space reserved in main store 110 to record trace data has been exhausted. In step 166, if sufficient space exists in main store 110, trace control logic 113 notifies the memory controller 100 logic in charge of controlling storage bus 105 that it has a trace record to store to main store 110. In steps 168 and 170, if memory controller 100 determines that it has no other request ready to drive to storage bus 105 and the bus is available, memory controller 100 accepts the trace record request from trace array controller logic 113 and stores the record to main store 110. In step 172 the address contained in current trace address register 108 is incremented by the size of the store and the address supplied to trace array 112 is advanced to point to the next entry to be stored to main store 110, and steps 162–172 are repeated. That is, trace array control logic 113 continues to issue trace record requests to memory controller 100 as long as records exist in trace array 112 which have not yet been stored to main store 110 and the store request would not exceed the capacity of main store 110 address space assigned to trace. Memory controller 100 continues to accept trace record requests as long as memory controller 100 has no other requests ready to drive to storage bus 105.

Advantages Over the Prior Art

It is an advantage of the invention that there is provided an improved trace system and method.

It is an advantage of the invention that there is provided a trace system and method which provides for capture of processor bus and I/O bus behavior.

It is an advantage of the invention that there is provided a system and method for enabling development of computer designs having high performance.

It is an advantage of the invention that there is provided off-chip storage of trace data which does not reserve and consume chip I/Os for problem debug.

It is a further advantage of the invention that there is provided a target system under test which stores trace signals to main store, the trace signals in main store thereafter being available for access and analysis by any mechanism which is capable of accessing main store, such as an I/O device, a target processor, or another processor.

ALTERNATIVE EMBODIMENTS

It will be appreciated that, although specific embodiments of the invention have been described herein for purposes of illustration, various modifications may be made without departing from the spirit and scope of the invention. In particular, it is within the scope of the invention to provide a program storage or memory device such as a solid or fluid transmission medium, magnetic or optical wire, tape or disc, or the like, for storing signals readable by a machine for controlling the operation of a computer according to the method of the invention and/or to structure its components in accordance with the system of the invention.

Accordingly, the scope of protection of this invention is limited only by the following claims and their equivalents.

I claim:

1. Method for capturing and storing trace data signals, comprising the steps of:

capturing and driving said trace data signals to a trace array for storage;

responsive to said trace array becoming full, disabling further signal capture and storing the contents of said trace array to main store.

2. Method for capturing and storing trace data signals, comprising the steps of:

capturing and driving said trace data signals to a trace array for storage at a first address location;

incrementing said first address to preserve said trace data signals and condition said trace array to receive subsequent trace data signals;

responsive to all available entries within said trace array containing captured trace data signal, disabling further signal capture and evaluating the space available in main store to receive trace data signals;

responsive to said main store not containing sufficient space allocated to trace data signals to receive the contents of said trace array, activating an attention signal indicating said main store trace storage is exhausted; otherwise, preempting any other storage requests and storing the contents of said trace array to said main store.

3. Method for capturing and storing trace data signals, comprising the steps of:

queuing in a storage request queue requests for storage of data signals in main store;

capturing and driving said trace data signals to a trace array for storage; responsive to said trace array containing at least one trace data signal record and said storage request queue being empty, evaluating the space available in main store to receive trace data signals and, if space is available, storing the contents of said trace array to said main store; and responsive to said trace array becoming full, disabling further capture of said trace data signals.

4. Method for capturing and storing trace data signals, comprising the steps of:

queuing in a storage request queue requests for storage of data signals in main store;

capturing and driving said trace data signals to a trace array for storage at a first address location;

incrementing said first address to preserve said trace data signals and condition said trace array to receive subsequent trace data signals;

responsive to said trace array containing at least one trace data signal record and said storage request queue being empty, evaluating the space available in main store to receive trace data signals and, if space is available, storing the contents of said trace array to said main store; otherwise, activating an attention signal; and responsive to said trace array becoming full, disabling further capture of said trace data signals and activating said attention signal.

5. System for capturing and storing trace data signals, comprising:

a memory controller including a trace array control logic, a trace array and a request queue;

said request queue being operable for storing requests for storage of data to said main store;

said trace array being operable under control of said trace array control logic for storing trace data signals; and said trace array being further operable responsive to said trace array becoming full for transferring the contents of said trace array to a main store.

6. System for capturing and storing trace data signals, comprising:

a memory controller;

a processing unit;

an input/output unit;

a main store;

said memory controller including a trace array control logic, a trace array and a request queue;

said request queue being operable for storing requests from said processing unit and said input/output unit for storage of data to said main store;

said trace array being operable under control of said trace array control logic for storing trace data signals selectively from said processing unit, said input/output unit or said memory controller; and said trace array being further operable responsive to said trace array becoming full for transferring the contents of said trace array to said main store.

7. The system of claim 6, said trace array control logic comprising:

a select register;

control register;

current trace address register; and trace end address register;

said control register being operable for enabling and disabling a trace function, controlling when trace record requests are sent to said memory controller, and identifying conditions that cause trace array entry creation;

said select register being operable for multiplexing said trace signals to said trace array selectively from said processing unit, said input/output unit and said memory controller;

said current trace address register being operable for storing the location in main store next to be updated with an entry from said trace array;

said trace end address register being operable for storing the last storage address assigned in main store for storing trace signal values.

8. A program storage device readable by a machine, tangibly embodying a program of instructions executable by a machine to perform method steps for capturing and storing trace data signals, said method steps comprising:

capturing and driving said trace data signals to a trace array for storage;

responsive to said trace array becoming full, disabling further signal capture and storing the contents of said trace array to main store.

9. An article of manufacture comprising:

a computer useable medium having computer readable program code means embodied therein for capturing and storing trace data signals, the computer readable program means in said article of manufacture comprising:

computer readable program code means for causing a computer to effect capturing and driving said trace data signals to a trace array for storage;

computer readable program code means for causing a computer to effect responsive to said trace array becoming full, disabling further signal capture and storing the contents of said trace array to main store.

10. A program storage device readable by a machine, tangibly embodying a program of instructions executable by a machine to perform method steps for capturing and storing trace data signals, said method steps comprising:

queuing in a storage request queue requests for storage of data signals in main store;

capturing and driving said trace data signals to a trace array for storage;

responsive to said trace array containing at least one trace data signal record and said storage request queue being empty, evaluating the space available in main store to receive trace data signals and, if space is available, storing the contents of said trace array to said main store; and responsive to said trace array becoming full, disabling further capture of said trace data signals.

11. An article of manufacture comprising:

a computer useable medium having computer readable program code means embodied therein for capturing and storing trace data signals, the computer readable program means in said article of manufacture comprising:

computer readable program code means for causing a computer to effect queuing in a storage request queue requests for storage of data signals in main store;

computer readable program code means for causing a computer to effect capturing and driving said trace data signals to a trace array for storage;

computer readable program code means for causing a computer to effect responsive to said trace array containing at least one trace data signal record and said storage request queue being empty, evaluating the space available in main store to receive trace data signals and, if space is available, storing the contents of said trace array to said main store; and computer readable program code means for causing a computer to effect responsive to said trace array becoming full, disabling further capture of said trace data signals.

12. System for capturing and storing trace data signals, comprising:

a memory controller;

a processing unit;

an input/output unit;

a main store;

said memory controller including a trace array control logic, a trace array and a request queue;

said request queue being operable for storing requests from said processing unit and said input/output unit for storage of data to said main store;

said trace array being operable under control of said trace array control logic for storing trace data signals selectively from said processing unit, said input/output unit or said memory controller; and said trace array being further operable responsive to said trace array becoming full for transferring the contents of said trace array to said main store.

said trace array control logic comprising a select register, a control register, a current trace address register, and a trace end address register;

said control register being operable for enabling and disabling a trace function, controlling when trace record requests are sent to said memory controller, and identifying conditions that cause trace array entry creation;

said select register being operable for multiplexing said trace signals to said trace array selectively from said processing unit, said input/output unit and said memory controller;

said current trace address register being operable for storing the location in main store next to be updated with an entry from said trace array;

said trace end address register being operable for storing the last storage address assigned in main store for storing trace signal values.

13. Method for capturing and storing trace data signals, comprising the steps of:

capturing and driving said trace data signals to a trace array for storage;

responsive to said trace array becoming full, disabling further signal capture and storing the contents of said trace array to program-addressable storage from which instructions and other data can be loaded directly into registers for subsequent execution or processing.

14. Method for capturing and storing trace data signals, comprising the steps of:

capturing and driving said trace data signals to a trace array for storage at a first address location;

incrementing said first address to preserve said trace data signals and condition said trace array to receive subsequent trace data signals;

responsive to all available entries within said trace array containing captured trace data signal, disabling further signal capture and evaluating the space available in program-addressable storage from which instructions can be loaded directly into registers to receive trace data signals;

responsive to said program-addressable storage not containing sufficient space allocated to trace data signals to receive the contents of said trace array, activating an attention signal indicating said main store trace storage is exhausted; otherwise, preempting any other storage requests and storing the contents of said trace array to said program-addressable storage.

15. System for capturing and storing trace data signals, comprising:

a program-addressable main storage for storing instructions and other data for loading directly to registers for subsequent execution or processing;

a memory controller including a trace array control logic, a trace array and a request queue;

said request queue being operable for storing requests for storage of data to said program-addressable main storage;

said trace array being operable under control of said trace array control logic for storing trace data signals; and said trace array being further operable responsive to said trace array becoming full for transferring the contents of said trace array to said program-addressable main storage.

16. System for capturing and storing trace data signals, comprising:

a memory controller;

a processing unit;

an input/output unit;

a program-addressable main store for storing instructions and other data for lading directly into registers for subsequent execution;

said memory controller including a trace array control logic, a trace array and a request queue;

said request queue being operable for storing requests from said processing unit and said input/output unit for storage of data to said main store;

said trace array being operable under control of said trace array control logic for storing trace data signals selectively from said processing unit, said input/output unit or said memory controller; and said trace array being further operable responsive to said trace array becoming full for transferring the contents of said trace array to said main store.

17. A program storage device readable by a machine, tangibly embodying a program of instructions executable by a machine to perform method steps for capturing and storing trace data signals, said method steps comprising:

capturing and driving said trace data signals to a trace array for storage;

responsive to said trace array becoming full, disabling further signal capture and storing the contents of said trace array to a main store from which instructions and other data may be loaded directly into registers for subsequent execution.

\* \* \* \* \*